(12) United States Patent
Choi et al.

(10) Patent No.: US 11,978,870 B2
(45) Date of Patent: May 7, 2024

(54) METHOD FOR MANUFACTURING SECONDARY BATTERY AND PRE-DEGASSING DEVICE FOR MANUFACTURING SECONDARY BATTERY

(71) Applicant: LG Energy Solution, Ltd., Seoul (KR)

(72) Inventors: Seong Won Choi, Daejeon (KR); Su Taek Jung, Daejeon (KR); Soon Kwan Kwon, Daejeon (KR); Tae Jong Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 17/783,895

(22) PCT Filed: Dec. 3, 2020

(86) PCT No.: PCT/KR2020/017531
§ 371 (c)(1),
(2) Date: Jun. 9, 2022

(87) PCT Pub. No.: WO2021/118160
PCT Pub. Date: Jun. 17, 2021

(65) Prior Publication Data
US 2023/0028907 A1   Jan. 26, 2023

(30) Foreign Application Priority Data
Dec. 12, 2019 (KR) .................. 10-2019-0166056

(51) Int. Cl.
*H01M 10/52* (2006.01)
*H01M 10/04* (2006.01)
(Continued)

(52) U.S. Cl.
CPC ....... *H01M 10/52* (2013.01); *H01M 10/0404* (2013.01); *H01M 10/0481* (2013.01);
(Continued)

(58) Field of Classification Search
CPC ............... H01M 10/52; H01M 10/526; H01M 10/0404; H01M 10/0409; H01M 10/0481;
(Continued)

(56) References Cited

U.S. PATENT DOCUMENTS

| | | | |
|---|---|---|---|
| 2001/0000484 A1* | 4/2001 | Lv ........................... | H01M 4/32 29/623.5 |
| 2015/0155588 A1* | 6/2015 | Lu ..................... | H01M 10/0409 29/730 |

(Continued)

FOREIGN PATENT DOCUMENTS

| | | |
|---|---|---|
| CN | 106711507 A | 5/2017 |
| EP | 3474363 A1 | 4/2019 |

(Continued)

OTHER PUBLICATIONS

Extended European Search Report including Written Opinion for Application No. 20898257.9 dated Jun. 23, 2023, pp. 1-11.

(Continued)

*Primary Examiner* — Raymond Alejandro
(74) *Attorney, Agent, or Firm* — Lerner David LLP

(57) ABSTRACT

The present invention relates to a method for manufacturing a secondary battery and a pre-degassing device for manufacturing a secondary battery. The method for manufacturing the secondary battery comprises: an accommodation process of accommodating an electrode assembly in an accommodation part formed inside a battery case to form a cell; an electrolyte injection process of injecting an electrolyte into the accommodation part of the battery case; a primary aging process of elapsing a predetermined time so that the electrode assembly is impregnated into the electrolyte; a primary charging process of primarily charging and discharging the cell; a pre-degassing process of pressing the battery case to discharge a gas inside the electrode assembly to the outside of the electrode assembly; and a secondary aging process of (Continued)

elapsing a predetermined time so that the electrode assembly is impregnated into the electrolyte, wherein, in the pre-degassing process, the battery case is pressed while applying heat to the battery case.

10 Claims, 14 Drawing Sheets

(51) Int. Cl.
  *H01M 10/44* (2006.01)
  *H01M 50/609* (2021.01)
(52) U.S. Cl.
  CPC ....... *H01M 10/049* (2013.01); *H01M 10/446* (2013.01); *H01M 50/609* (2021.01)
(58) Field of Classification Search
  CPC ............. H01M 10/049; H01M 10/446; H01M 10/443; H01M 10/4214; H01M 10/058; H01M 10/38; H01M 50/609; H01M 50/618; H01M 50/627
  See application file for complete search history.

(56) References Cited

U.S. PATENT DOCUMENTS

| | | | |
|---|---|---|---|
| 2016/0172718 A1 | 6/2016 | Kawashima et al. | |
| 2016/0308181 A1 | 10/2016 | Kato et al. | |
| 2017/0125854 A1 | 5/2017 | Phan et al. | |
| 2017/0331144 A1 | 11/2017 | Oguni et al. | |
| 2018/0034097 A1 | 2/2018 | Uwai et al. | |
| 2019/0207183 A1 | 7/2019 | Park et al. | |
| 2019/0237823 A1 | 8/2019 | Lee et al. | |
| 2020/0058954 A1 | 2/2020 | Oguni et al. | |
| 2020/0099037 A1* | 3/2020 | Culver | H01M 10/0431 |

FOREIGN PATENT DOCUMENTS

| | | |
|---|---|---|
| JP | 2004207181 A | 7/2004 |
| JP | 2008027741 A | 2/2008 |
| JP | 5070754 B2 | 11/2012 |
| JP | 5151755 B2 | 2/2013 |
| JP | 2015005350 A | 1/2015 |
| JP | 6102556 B2 | 3/2017 |
| JP | WO2015087760 A1 | 3/2017 |
| JP | 2017511584 A | 4/2017 |
| JP | 6542754 B2 | 7/2019 |
| KR | 20140015647 A | 2/2014 |
| KR | 20140139356 A | 12/2014 |
| KR | 20150062849 A | 6/2015 |
| KR | 20150089164 A | 8/2015 |
| KR | 20160020519 A | 2/2016 |
| KR | 101669714 B1 | 10/2016 |
| KR | 20160132572 A | 11/2016 |
| KR | 101692795 B1 | 1/2017 |
| KR | 20170033601 A | 3/2017 |
| KR | 20170035565 A | 3/2017 |
| KR | 101748362 B1 | 6/2017 |
| KR | 20170094669 A | 8/2017 |
| KR | 20170128102 A | 11/2017 |
| KR | 101889675 B1 | 8/2018 |
| KR | 20180090744 A | 8/2018 |
| KR | 20180113819 A | 10/2018 |
| KR | 101980226 B1 | 5/2019 |

OTHER PUBLICATIONS

International Search Report for Application No. PCT/KR2020/017531 dated Mar. 11, 2021, 2 pages.

* cited by examiner

METHOD FOR MANUFACTURING SECONDARY BATTERY AND PRE-DEGASSING DEVICE FOR MANUFACTURING SECONDARY BATTERY

CROSS-REFERENCE TO RELATED APPLICATION

The present application is a national stage entry under 35 U.S.C. § 371 of International Application No. PCT/KR2020/017531, filed on Dec. 3, 2020, published in Korean, which claims priority to Korean Patent Application No. 10-2019-0166056, filed on Dec. 12, 2019, the disclosures of which are hereby incorporated by reference herein in their entireties.

TECHNICAL FIELD

The present invention relates to a method for manufacturing a secondary battery and a pre-degassing device for manufacturing a secondary battery.

BACKGROUND ART

Secondary batteries are rechargeable unlike primarily batteries, and also, the possibility of compact size and high capacity is high. Thus, recently, many studies on secondary batteries are being carried out. As technology development and demands for mobile devices increase, the demands for secondary batteries as energy sources are rapidly increasing.

Rechargeable batteries are classified into coin type batteries, cylindrical type batteries, prismatic type batteries, and pouch type batteries according to a shape of a battery case. The secondary battery accommodates an electrode assembly and an electrolyte. In such a secondary battery, an electrode assembly mounted in a battery case is a chargeable and dischargeable power generating device having a structure in which an electrode and a separator are stacked.

The electrode assembly may be approximately classified into a jelly-roll type electrode assembly in which a separator is interposed between a positive electrode and a negative electrode, each of which is provided as the form of a sheet coated with an active material, and then, the positive electrode, the separator, and the negative electrode are wound, a stacked type electrode assembly in which a plurality of positive and negative electrodes with a separator therebetween are sequentially stacked, and a stack/folding type electrode assembly in which stacked type unit cells are wound together with a separation film having a long length.

In order to increase in battery capacity and improve a cycle, a secondary battery is being designed in a direction of increasing in loading amount and amount of electrolyte additives.

The increasing in load amount and amount of additives for improving the cycle characteristics leads to an increase in amount of gas generated during primary charging.

Due to the increase in amount of gas, the gas is not effectively removed in a subsequent degassing process. In addition, when a degree of vacuum, a time, a pusher pressure, and the like increase to remove the gas, there is a problem that is likely to cause deterioration in cycle due to the increase in amount of discharged electrolyte inside a cell.

[Prior Art Document] (Patent Document) Korean Patent Publication No. 10-2014-0015647

DISCLOSURE OF THE INVENTION

Technical Problem

One aspect of the prevent invention is to provide a method for manufacturing a secondary battery, which is capable of removing an internal gas of an electrode assembly by additionally performing a pre-degassing process when the secondary battery is manufactured, and a pre-degassing device for manufacturing a secondary battery.

Technical Solution

A method for manufacturing a secondary battery according to an embodiment of the present invention comprises: an accommodation process of accommodating an electrode assembly in an accommodation part formed inside a battery case to form a cell; an electrolyte injection process of injecting an electrolyte into the accommodation part of the battery case; a primary aging process of elapsing a predetermined time so that the electrode assembly is impregnated into the electrolyte; a primary charging process of primarily charging and discharging the cell; a pre-degassing process of pressing the battery case to discharge a gas inside the electrode assembly to the outside of the electrode assembly; and a secondary aging process of elapsing a predetermined time so that the electrode assembly is impregnated into the electrolyte, wherein, in the pre-degassing process, the battery case is pressed while applying heat to the battery case.

A pre-degassing device for manufacturing a secondary battery according to an embodiment of the present invention comprises: a pressing roll configured to apply heat so as to press a cell, in which an electrode assembly and an electrolyte are accommodated in a battery case when the secondary battery is manufactured, before a secondary aging process after primary aging and primary charging; and a support body configured to support the pressing roll, wherein the battery case of the cell is pressed through the pressing roll to discharge a gas inside the electrode assembly to the outside of the electrode assembly.

Advantageous Effects

According to the present invention, when the secondary battery is manufactured, the pre-degassing process may be additionally performed after the primary charging to remove the internal gas of the electrode assembly. Therefore, the amount of discharged electrolyte inside the electrode assembly may not increase to prevent the cycle from being deteriorated.

MODE FOR CARRYING OUT THE INVENTION

Figure 1:
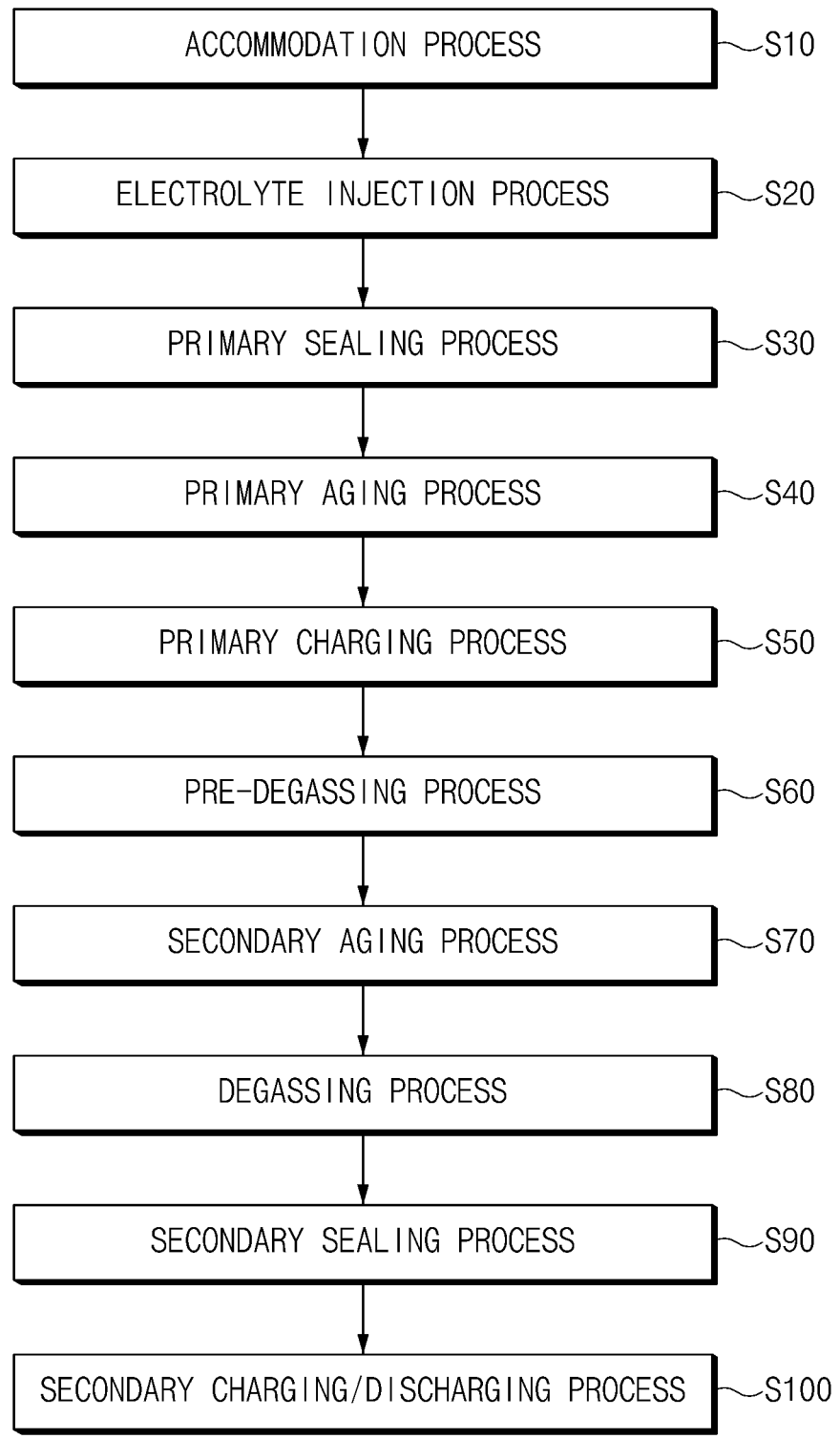
FIG. 1 is a flowchart illustrating a method for manufacturing a secondary battery according to an embodiment of the present invention.

The objectives, specific advantages, and novel features of the present invention will become more apparent from the following detailed description taken in conjunction with the accompanying drawings. It should be noted that the reference numerals are added to the components of the drawings in the present specification with the same numerals as possible, even if they are illustrated in other drawings. Also, the present invention may be embodied in different forms and should not be construed as limited to the embodiments set forth herein. In the following description of the present invention, the detailed descriptions of related arts which may unnecessarily obscure the gist of the present invention will be omitted.

Method for Manufacturing Secondary Battery

Figure 2:
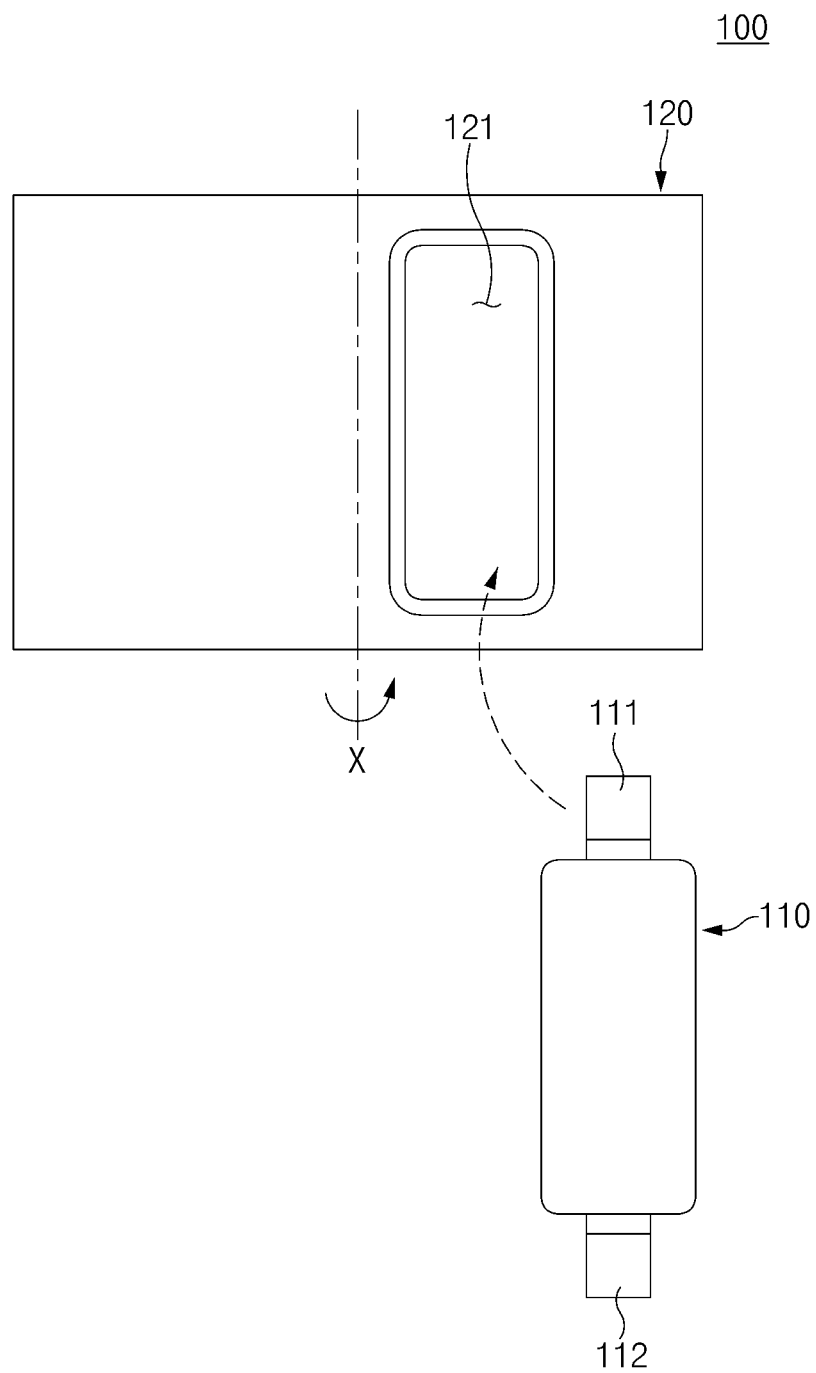
FIG. 2 is a plan view illustrating an accommodation process in the method for manufacturing the secondary battery according to an embodiment of the present invention.
Figure 3:
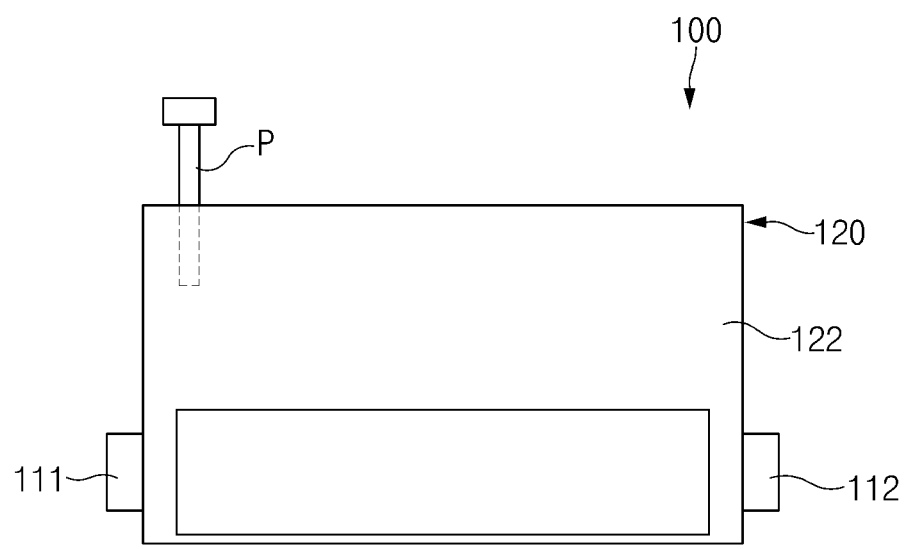
FIG. 3 is a front view illustrating an electrolyte injection process in the method for manufacturing the secondary battery according to an embodiment of the present invention.

FIG. 1 is a flowchart illustrating a method for manufacturing a secondary battery according to an embodiment of the present invention, FIG. 2 is a plan view illustrating an accommodation process in the method for manufacturing the secondary battery according to an embodiment of the present invention, and FIG. 3 is a front view illustrating an electrolyte injection process in the method for manufacturing the secondary battery according to an embodiment of the present invention.

Figure 4:
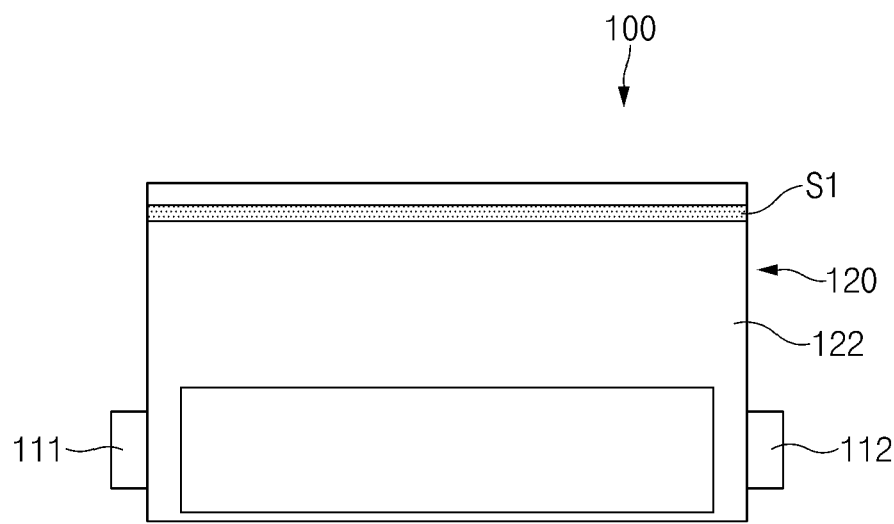
FIG. 4 is a plan view illustrating a primary sealing process in the method for manufacturing the secondary battery according to an embodiment of the present invention.
Figure 5:
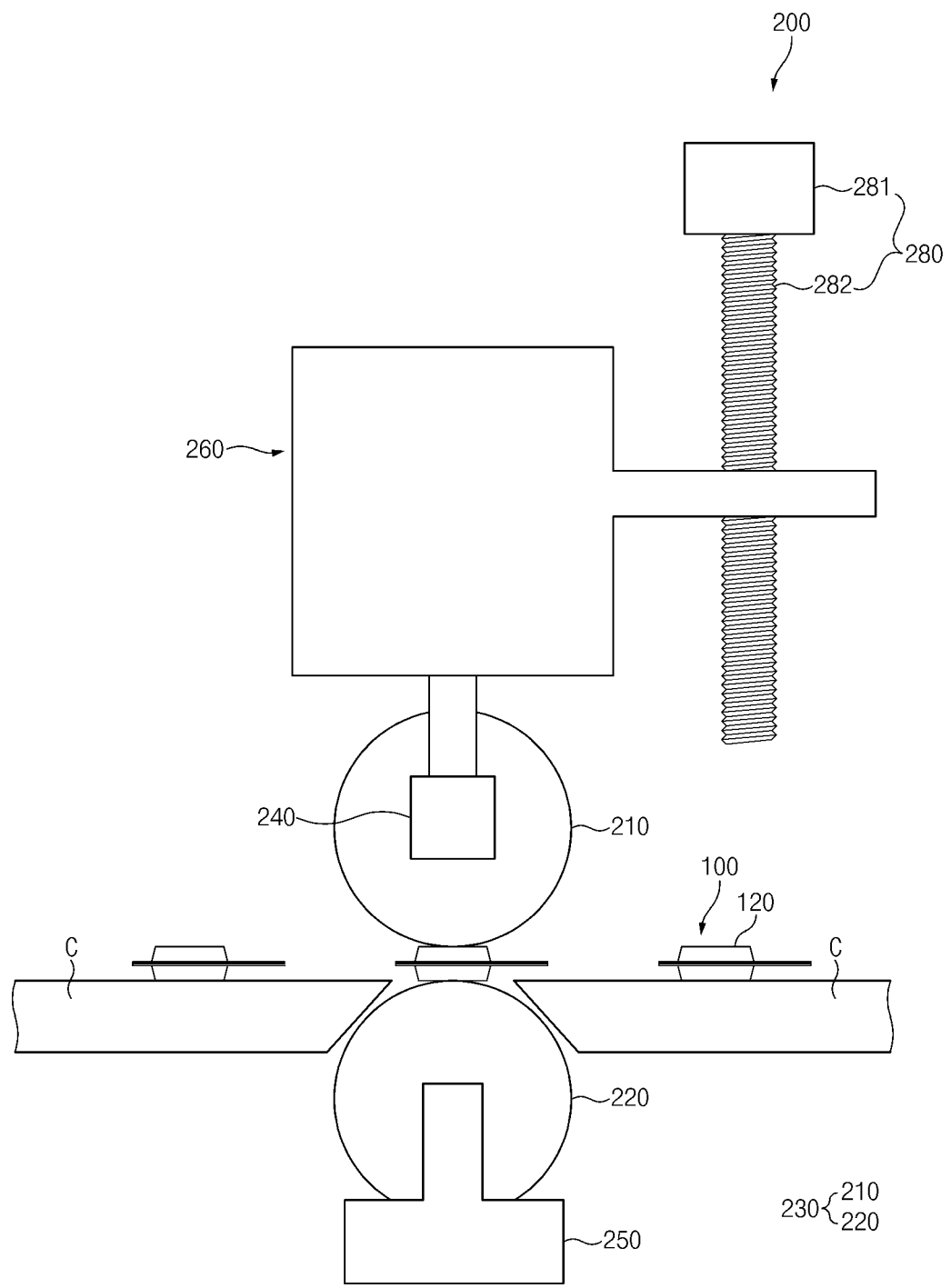
FIG. 5 is a front view illustrating a pre-degassing process in the method for manufacturing the secondary battery according to an embodiment of the present invention.

FIG. 4 is a plan view illustrating a primary sealing process in the method for manufacturing the secondary battery according to an embodiment of the present invention, and FIG. 5 is a front view illustrating a pre-degassing process in the method for manufacturing the secondary battery according to an embodiment of the present invention.

Referring to FIGS. 1 to 5, a method for manufacturing a secondary battery according to an embodiment of the present invention comprises an accommodation process (S10) of accommodating an electrode assembly 110 in a battery case 120, an electrolyte injection process (S20) of injecting an electrolyte, a primary aging process of elapsing for a predetermined time, a first charging process (S50) of performing primary charging/discharging, a pre-degassing process (S60) of pressing the battery case 120, and a secondary aging process (S70) of elapsing for a predetermined time to manufacture the secondary battery.

Also, the method for manufacturing the secondary battery according to an embodiment of the present invention further comprises a primary sealing process (S30) of sealing the battery case 120 after the electrolyte injection process (S20).

Referring to FIG. 2, a cell 100 comprises a battery case 120 and an electrode assembly 110 accommodated in an accommodation part 121 of the battery case 120. Here, the electrode assembly 110 may comprise electrode leads 111 and 112 electrically connected to an electrode.

The electrode assembly 110 may be a chargeable and dischargeable power generation element and be formed by alternately stacking electrodes and separators.

The electrodes may be constituted by a positive electrode and a negative electrode. At this time, the electrode assembly 110 may have a structure in which the positive electrode/separator/negative electrode are alternately stacked. Also, the electrode leads 111 and 112 may comprise a positive electrode lead 111 connected to the positive electrode and a negative electrode lead 112 connected to the negative electrode.

The positive electrode may comprise a positive electrode collector and a positive electrode active material stacked on the positive electrode collector.

The positive electrode collector may be made of an aluminum foil.

The positive electrode active material may comprise lithium manganese oxide, lithium cobalt oxide, lithium nickel oxide, lithium iron phosphate, or a compound or mixture containing at least one of the above-described materials.

The negative electrode may comprise a negative electrode collector and a negative active material stacked on the negative electrode collector.

The negative electrode collector may be made of, for example, a foil made of a copper (Cu) material.

The negative active material may be a compound or a mixture containing a graphite-based material.

The separator is made of an insulating material to electrically insulates the positive electrode and the negative electrode from each other. Here, the separator may be made of a polyolefin-based resin film such as polyethylene or polypropylene having microporosity.

Referring to FIGS. 1 and 2, in the accommodation process (S10), the electrode assembly 110 may be accommodated in the accommodation part 121 formed inside the battery case 120 to form the cell 100.

Here, referring to FIGS. 2 and 3, the battery case 120 may comprise the accommodation part 121, in which the electrode assembly 110 is accommodated, and a gas pocket part 122 connected to the accommodation part 121 to collect a gas generated in the accommodation part 121.

Referring to FIGS. 1 and 3, in the electrolyte injection process (S20), the electrolyte may be injected into the accommodation part 121 of the battery case 120.

At this time, in the electrolyte injection process (S20), the electrolyte may be injected into the battery case 120 through an electrolyte supply pipe P.

Here, the electrolyte may comprise salt, a solvent, and an additive.

Referring to FIGS. 1 and 4, in the primary sealing process (S30), the battery case 120 may be sealed after the electrolyte injection process (S20).

Here, in the primary sealing process (S30), after the electrolyte injection process (S20) and before the primary aging process (S40), an opened portion of the battery case 120 may be sealed to form a sealing part S1.

At this time, the opened portion may be sealed by thermally sealing an end of the gas pocket part 122 in the battery case 120.

In the primary aging process S40, a predetermined time may elapse so that the electrode assembly is impregnated into the electrolyte.

Thus, the electrode assembly may be impregnated into the electrolyte so that lithium ions are moved smoothly.

In the primary charging process (S50), the cell 100 may be primarily charged and discharged.

In the primary charging process (S50), the cell 100 may be changed by connecting electricity to the electrode leads 111 and 112 of the cell 100.

Figure 6:
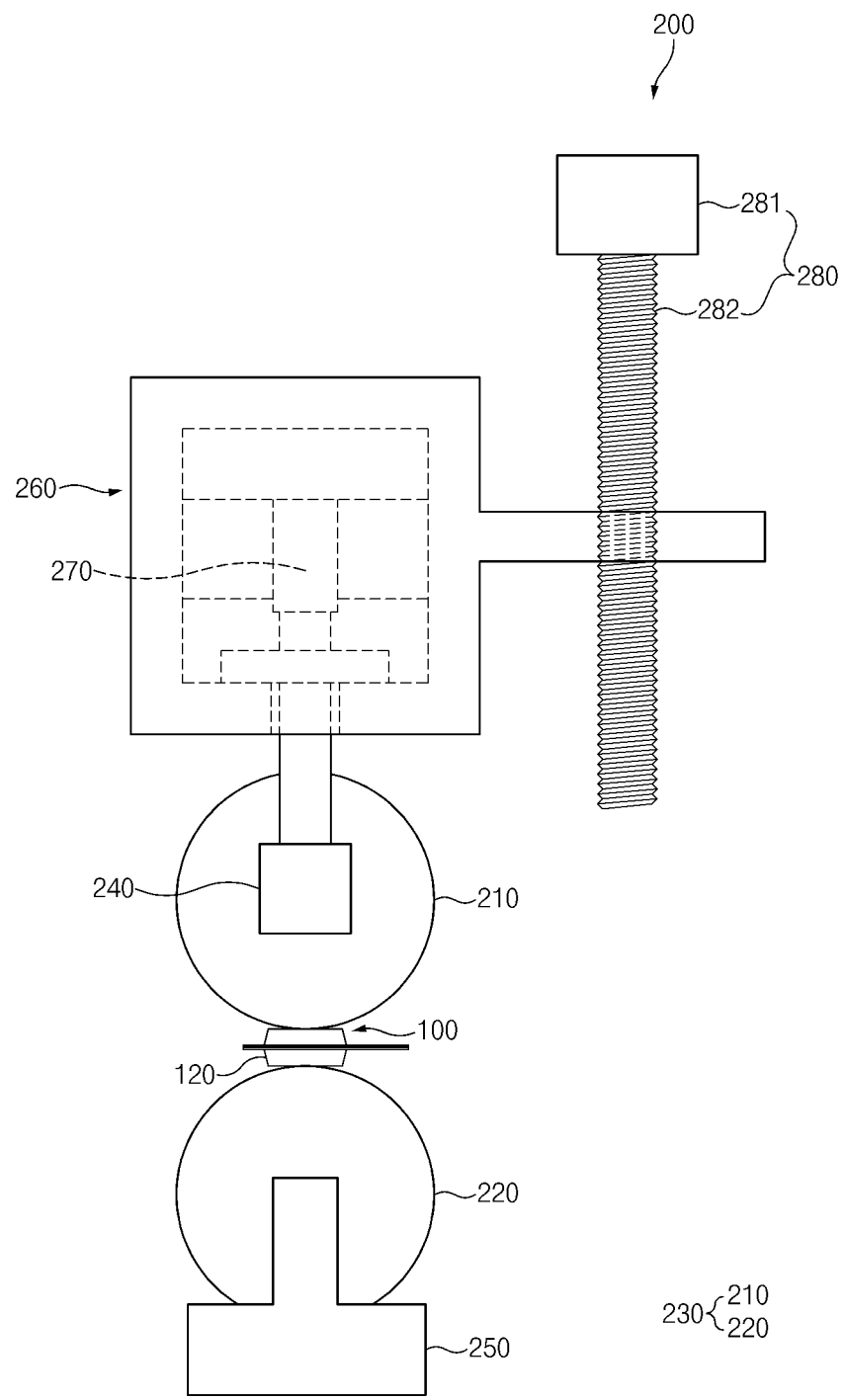
FIG. 6 is a front see-through view illustrating a portion of a pre-degassing device that performs the pre-degassing process in the method for manufacturing the secondary battery according to an embodiment of the present invention.
Figure 7:
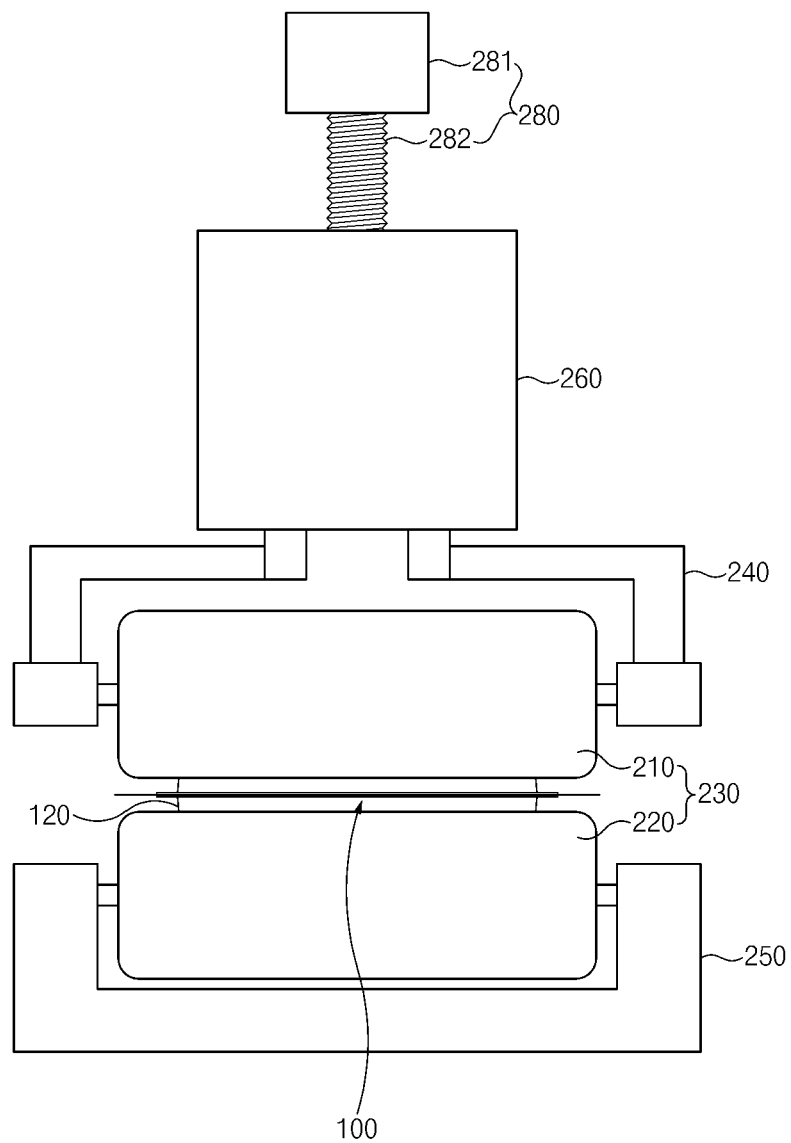
FIG. 7 is a side view illustrating the pre-degassing device that performs the pre-degassing process in the method for manufacturing the secondary battery according to an embodiment of the present invention.
Figure 8:
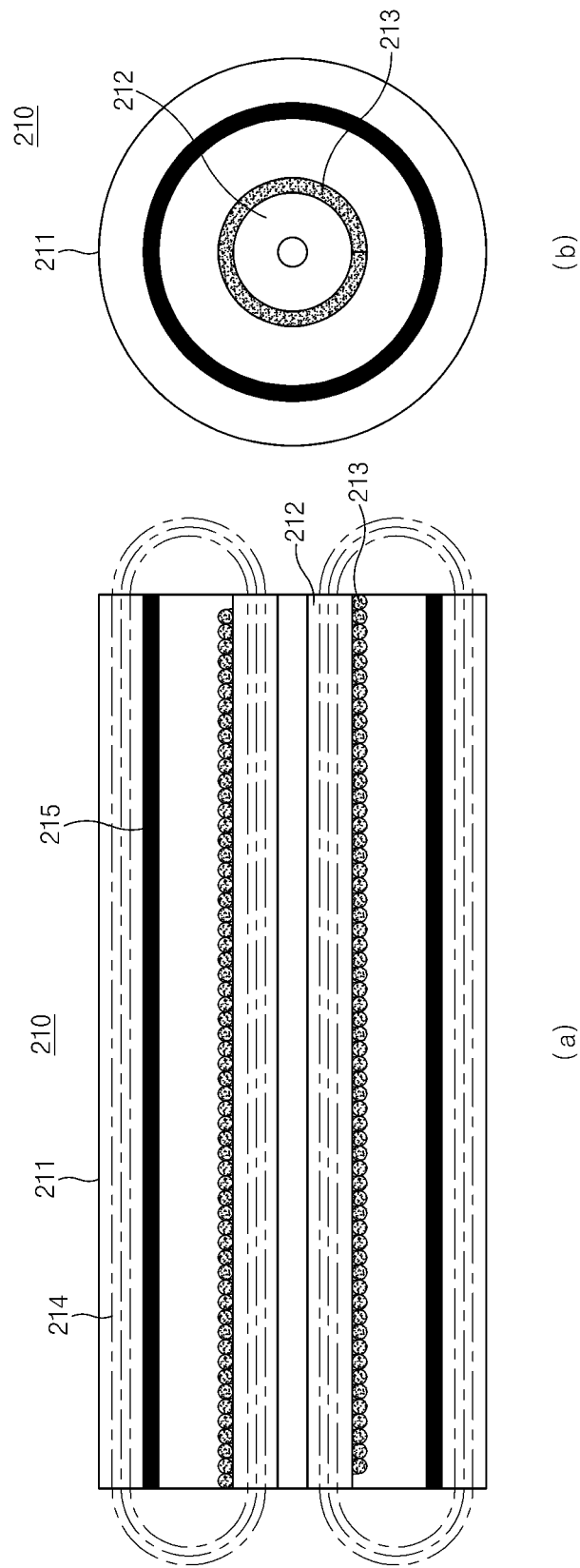
FIG. 8 is front and side cross-sectional views illustrating a pressing roll to which the pre-degassing process is applied in the method for manufacturing the secondary battery according to an embodiment of the present invention.

FIG. 6 is a front see-through view illustrating a portion of a pre-degassing device that performs the pre-degassing process in the method for manufacturing the secondary battery according to an embodiment of the present invention, FIG. 7 is a side view illustrating the pre-degassing device that performs the pre-degassing process in the method for manufacturing the secondary battery according to an embodiment of the present invention, and FIG. 8 is front and side cross-sectional views illustrating a pressing roll to which the pre-degassing process is applied in the method for manufacturing the secondary battery according to an embodiment of the present invention.

Referring to FIGS. 1 and 6 to 8, in the pre-degassing process (S60), the battery case 120 of the cell 100 may be pressed to discharge a gas inside the electrode assembly 110 to the outside of the electrode assembly 110. Here, in the pre-degassing process (S60), the gas inside the electrode assembly 110 in the battery case 120 may be discharged to the outside of the electrode assembly 110 without forming a hole in the battery case 120. Then, the gas discharged to the outside of the electrode assembly 110 may be discharged to the outside of the battery case 120. Thus, the internal gas of the electrode assembly 110 may be removed through the pre-degassing to reduce a non-reaction area on the negative electrode because an amount of discharged electrolyte inside the electrode assembly 110 does not increase, and also, prevent the cycle from being deteriorated.

Also, the pre-degassing process (S60) may be sequentially performed on the cells 100 transferred through a conveyor belt C, which is a transfer means, through the pre-degassing device 200.

Also, in the pre-degassing process (S60), the battery case 120 of the cell 100 may be pressed while applying heat to the battery case 120 of the cell 100. Thus, the removing of the internal gas the electrode assembly 110 accommodated in the cell 100 due to an increase in temperature of the cell 100 may be improved, and wrinkles on the exterior of the cell 100 may be prevented because the temperature and pressure are applied together to improve stiffness. Here, in the pre-degassing process (S60), the battery case 120 of the cell 100 may be pressed while applying heat having a temperature of 20° C. to 100° C. Here, in the pre-degassing process (S60), heat may be applied to the battery case 110 through a pressing roll 230 provided as an induction heating roller.

The pressing roll 230 may comprise an upper roll 210 and a lower roll 220 to press upper and lower portions of the cell 100. Here, the upper roll 210 or each of the upper roll 210 and the lower roll 220 may be provided as an induction heating roller.

At this time, referring to FIG. 8, the upper roll 210 may comprise a shaft 212 provided at a center thereof, an induction coil 213 wound around an outer circumferential surface of the shaft 212, and an outer cylinder 211 provided on an outer circumferential surface thereof. When power is supplied to the induction coil 213, a magnetic flux 214 crossing the outer cylinder 211 of the upper roll 210 is generated. As a result, the magnetic flux 214 may generate an eddy current in the outer cylinder 211, and, as illustrated in FIG. 7(*a*), a current flow such as an equivalent circuit may be generated to heat the outer cylinder 211. At this time, heating of an initial heating portion 215 of the outer cylinder 211 may start to heat the entire outer cylinder 211.

Furthermore, referring to FIGS. 1 and 5 to 7, in the pre-degassing process (S60), an outer surface of the battery case 120 may be pressed in a roll press manner through the pressing roll 230. Here, in the pre-degassing process (S60), the outer surface of the battery case 120 may be rolled through the pressing roll to press the cell 100.

Also, in the pre-degassing process (S60), pressing force applied to the battery case 120 may be adjusted according to a structure and thickness of the cell 100. Here, the pressing force may be adjusted within a pressure range of 100 kgf to 400 kgf. At this time, in the pre-degassing process (S60), an actuator 270 may be connected to a support body 240 supporting the pressing roll 230 to adjust the pressing force applied to the battery case 120 of the cell 100 through the actuator 270. Here, the support body 240 rotatably supports the upper roll 210, and the pressing force applied to the cell 100 may be adjusted by adjusting the pressing force applied to the upper roll 210 through the actuator 270.

Also, in the pre-degassing process (S60), a distance between the upper roll 210 and the lower roll 220 may be adjusted according to the thickness of the cell 100. Here, in the pre-degassing process (S60), the distance between the upper roll 210 and the lower roll 220 may be adjusted through a distance adjustment means 280.

The distance adjustment means 280 may comprise a motor 281 and a screw rod 282 that rotates by the motor 281.

When the screw rod 282 rotates by the motor 281, a moving frame 260 coupled to the screw rod is moved vertically. At this time, the support body 240 supporting the upper roll 210 provided under the moving frame 260 may be moved vertically to adjust the distance between the upper roll 210 and the lower roll 220.

The motor 281 may be provided as a servo motor.

The lower roll 220 may be rotatably supported through a support part 250.

In the secondary aging process (S70), a predetermined time may elapse so that the electrode assembly 110 is impregnated into the electrolyte.

In the secondary aging process (S70), the cell 100 may elapse for a predetermined time at room temperature and a high temperature.

Figure 9:
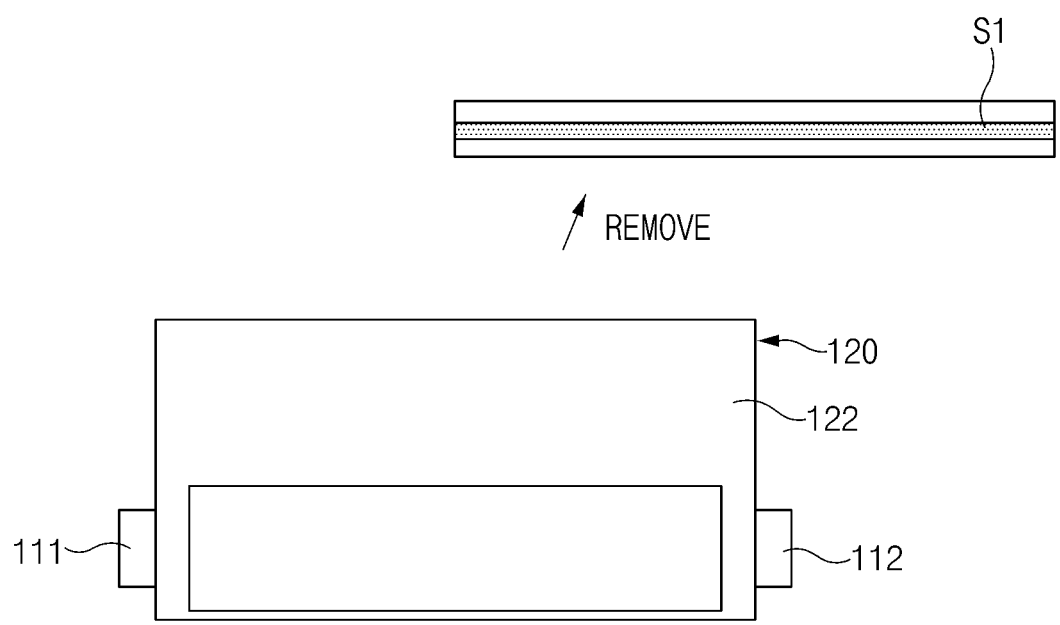
FIG. 9 is a front view illustrating a degassing process in the method for manufacturing the secondary battery according to an embodiment of the present invention.
Figure 10:
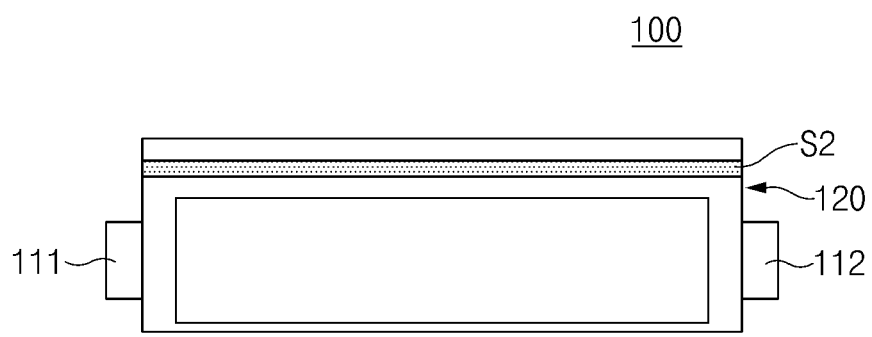
FIG. 10 is a front view illustrating a second sealing process in the method for manufacturing the secondary battery according to an embodiment of the present invention.

FIG. 9 is a front view illustrating a degassing process in the method for manufacturing the secondary battery according to an embodiment of the present invention, and FIG. 10 is a front view illustrating a secondary sealing process in the method for manufacturing the secondary battery according to an embodiment of the present invention.

Referring to FIGS. 1, 9 and 10, the method for manufacturing the secondary battery according to an embodiment of the present invention further comprise a degassing process (S80), a second sealing process (S90) and a secondary charging/discharging process (S100) after the secondary aging process (S70).

Referring to FIGS. 1 and 9, in the degassing process, after performing the secondary aging process (S70), an internal gas of the battery case 120 may be discharged to the outside of the battery case 120 before the secondary charging/discharging process (S100).

At this time, the sealing part S1 formed at the end of the gas pocket part 122 in the battery case 120 may be removed by being cut using a cutter to discharge the internal gas of the battery case 120 through the cut portion of the gas pocket part 122.

Referring to FIGS. 1 and 10, in the secondary sealing process (S90), the battery case 120 may be sealed after performing the degassing process (S80).

Also, in the secondary sealing process (S90), the gas pocket part may be cut and removed, and then, the removed portion may form a sealed part S2 through thermal fusion to seal the battery case 120.

In the secondary charging/discharging process (S100), after performing the secondary aging process (S70), the cell 100 may be secondarily charged/discharged to manufacture a secondary battery. Here, in the secondary charging/discharging process (S100), after performing the secondary aging process (S70) and the secondary sealing process (S90), the cell 100 may be secondarily charged/discharged (see FIG. 1).

Also, in the secondary charging and discharging process (S100), the cell 100 may be charged by connecting electricity to the electrode leads 111 and 112 of the cell 100.

Figure 11:
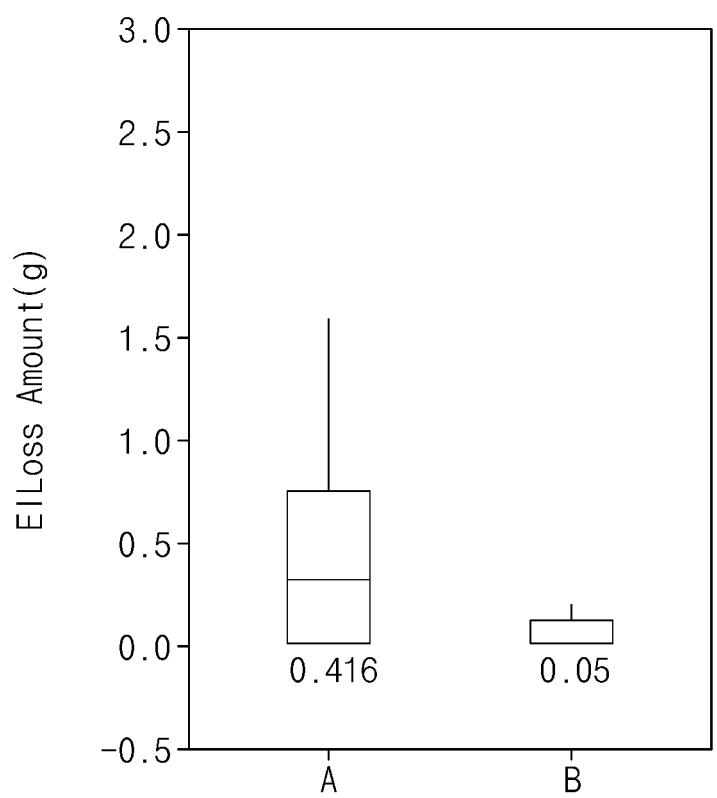
FIG. 11 is a graph illustrating an amount of discharged electrolyte during the degassing process in the method for manufacturing the secondary battery according to an embodiment of the present invention.

FIG. 11 is a graph illustrating an amount of discharged electrolyte during the degassing process in the method for manufacturing the secondary battery according to an embodiment of the present invention.

As illustrated in the graph of FIG. 11, when degassing a cell A manufactured in the process of manufacturing the secondary battery according to the related art, an amount of discharged electrolyte inside the electrode assembly was 0.416 g. On the other hand, when degassing a cell B manufactured in the process of manufacturing the secondary battery according to an embodiment of the present invention, an amount of discharged electrolyte inside the electrode assembly was 0.05 g.

In more detail, in the cell A manufactured in the process of manufacturing the secondary battery according to the related art, when performing the degassing process in which a hole is formed in the battery case to discharge a gas inside the battery case to the outside, the gas inside the electrode assembly is discharged together with the electrolyte while discharging the gas to the outside of the battery case through the outside of the electrode assembly. At this time, the gas inside the electrode assembly pushes and lifts the electrolyte to increase in amount of discharged electrolyte.

However, when degassing the cell B manufactured in the process of manufacturing the secondary battery according to an embodiment of the present invention, the gas inside the electrode assembly is discharged to the outside of the electrode assembly through the pre-degassing process. Then, the discharged gas is disposed above the electrolyte to discharge only the gas disposed above the electrolyte, and the hole is formed in the battery case to discharge only the gas disposed above the electrolyte. Thus, the amount of discharged electrolyte is significantly reduced.

As a result, in the cell B manufactured in the process of manufacturing the secondary battery according to an embodiment of the present invention, in which the pre-degassing process is performed when compared to the cell A manufactured in the process of manufacturing the secondary battery according to the related art, the amount of discharged electrolyte inside the electrode assembly may be significantly low, and thus, it may be expected that no cycle deterioration occurs.

Figure 12:
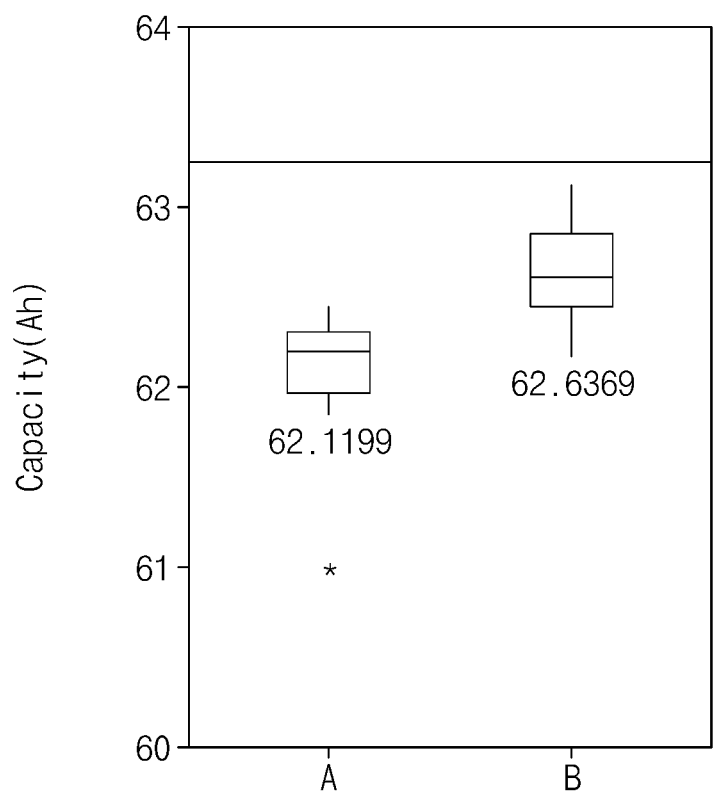
FIG. 12 is a graph illustrating a second formation capacity when the secondary battery is manufactured according to the related art and according to an embodiment of the present invention.

FIG. 12 is a graph illustrating a second formation capacity when the secondary battery is manufactured according to the related art and according to an embodiment of the present invention.

As illustrated in the graph of FIG. 12, an average capacity of a secondary formation of the cell A manufactured in the process of manufacturing the secondary battery according to the related art is 62.1199 (Ah). On the other hand, it is seen that an average capacity of a secondary formation of the cell B manufacturing in the process of manufacturing the secondary battery according to an embodiment of the prevent invention is 62.6369 (Ah).

Therefore, in the cell B manufactured in the process of manufacturing the secondary battery according to an embodiment of the present invention, in which the pre-degassing process is performed when compared to the cell A manufactured in the process of manufacturing the secondary battery according to the related art, it is seen that the secondary formation capacity is improved due to the reduction of the non-reaction area on the negative electrode.

Figure 13:
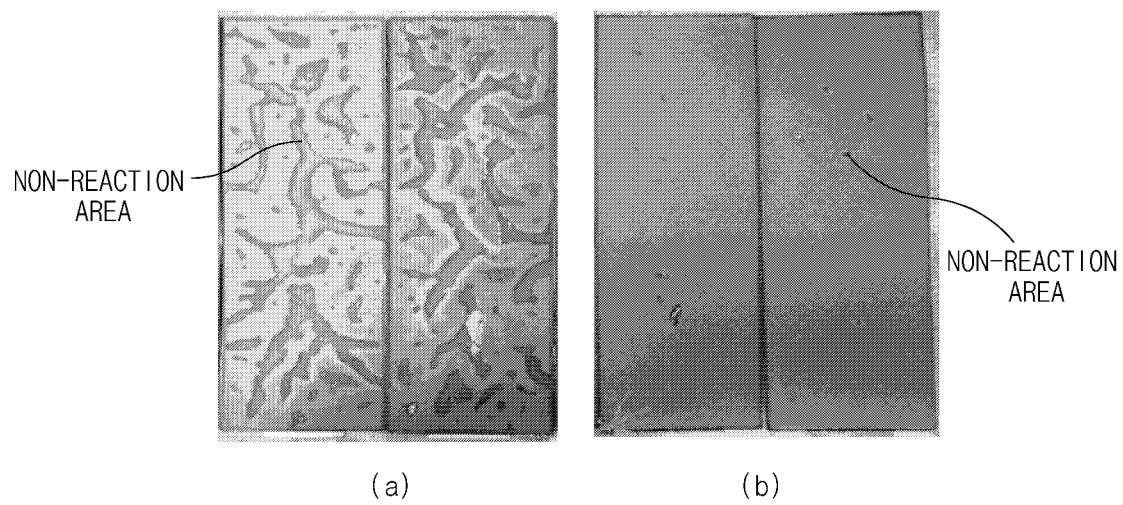
FIG. 13 is a photograph illustrating a non-reaction area on a surface of a negative electrode due to a reaction gas when fully decomposed after the primary charging in the method for manufacturing the secondary battery according to an embodiment of the present invention.

FIG. 13 is a photograph illustrating a non-reaction area on a surface of a negative electrode due to a reaction gas when fully decomposed after the primary charging in the method for manufacturing the secondary battery according to an embodiment of the present invention.

As illustrated in FIG. 13(a), when the cell is fully decomposed after the primary charging in the process of manufacturing the secondary battery according to the related art, it is seen that the non-reaction area on the surface of the negative electrode due to the reaction gas occupies a wide area.

However, as illustrated in FIG. 13(b), when the cell is fully decomposed after the primary charging in the process of manufacturing the secondary battery according to an embodiment of the present invention, it is seen that the non-reaction area on the surface of the negative electrode due to the reaction gas is significantly reduced.

Therefore, it is seen that, in the cell manufactured in the method for manufacturing the secondary battery according to an embodiment of the present invention, in which the pre-degassing process is performed, the battery capacity is significantly improved due to the reduction of the reduction of the non-reaction area on the negative electrode when compared to the cell manufactured in the method for manufacturing the secondary battery according to the related art.

Figure 14:
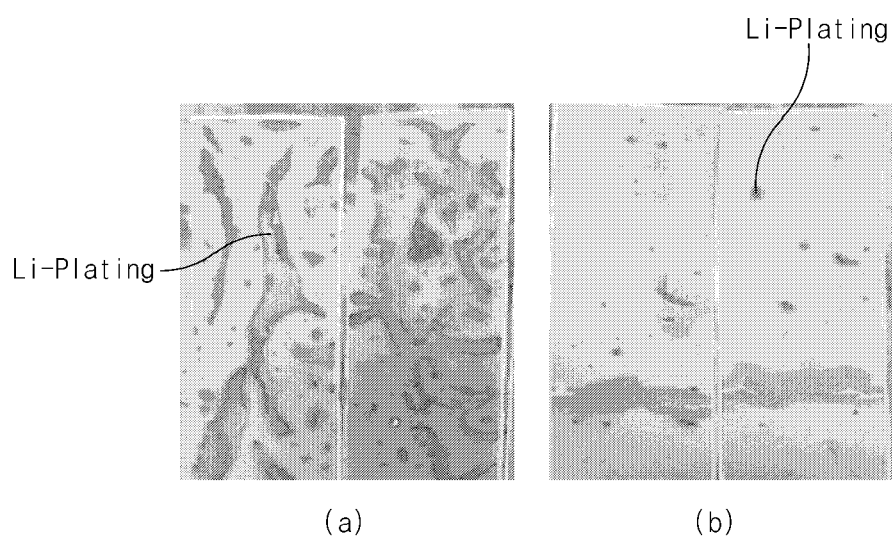
FIG. 14 is a photograph illustrating Li-plating on the surface of the negative electrode due to the reaction gas when fully decomposed after the primary charging in the method for manufacturing the secondary battery according to an embodiment of the present invention.

FIG. 14 is a photograph illustrating Li-plating on the surface of the negative electrode due to the reaction gas when fully decomposed after the primary charging in the method for manufacturing the secondary battery according to an embodiment of the present invention.

As illustrated in FIG. 14(a), when the cell is fully decomposed after the primary charging in the process of manufacturing the secondary battery according to the related art, it is seen that Li-plating due to the reaction gas occupies a wide area.

However, as illustrated in FIG. 14(b), when the cell in which the electrolyte is fully charged is decomposed after the primary charging of the cell in the process of manufacturing the secondary battery according to an embodiment of the present invention, it is seen that the Li-plated portion due to the reaction gas on the negative electrode of the electrode assembly is significantly reduced.

Therefore, it is seen that, in the cell manufactured in the method for manufacturing the secondary battery according to an embodiment of the present invention, in which the pre-degassing process is performed, the battery capacity is improved due to the significant reduction of the LI-plated portion at which Lithium ions are solidified to improve when compared to the cell manufactured in the method for manufacturing the secondary battery according to the related art.

Pre-Degassing Device for Manufacturing Secondary Battery

Hereinafter, an apparatus for manufacturing a secondary battery according to an embodiment of the present invention will be described.

Referring to FIGS. 2, 5 to 8, an apparatus for manufacturing a secondary battery according to an embodiment of the present invention comprises a pressing roll 230 that applies heat to a cell 100, in which an electrode assembly 110 and an electrolyte are accommodated in a battery case 120, to press the call 100 and a support body 240 that supports the pressing roll 230. Also, the apparatus for manufacturing the secondary battery according to an embodiment of the present invention may further comprise a distance adjustment means 280 and an actuator 270.

A pre-degassing device 200 for manufacturing the secondary battery according to an embodiment of the present invention is a pre-degassing device 200 for manufacturing the secondary battery, which is applied to the method for manufacturing the secondary battery according to the embodiment of the present invention. Thus, in descriptions of the pre-degassing device 200 for manufacturing the secondary battery according to this embodiment of the present invention, contents duplicated with the method for manufacturing the secondary battery according to forgoing embodiment of the present invention will be omitted or briefly described, and also, differences therebetween will be mainly described.

In more detail, in the pre-degassing device 200 for manufacturing the secondary battery according to an embodiment of the present invention, when the secondary battery is manufactured, before a secondary aging process (S70) after a primary aging process (S40) and a primary charging process (S50), a battery case 120 of a cell 100 is pressed through a pressing roll 230 to discharge a gas inside an electrode assembly 110 to the outside of the electrode assembly 110 (see FIG. 1).

The pressing roll 230 may apply heat to the cell 100, in which the electrode assembly 110 and the electrolyte are accommodated in the battery case 120, to press the cell 100. Here, the pressing roll 230 may press the outer surface of the battery case 120 in a roll press manner. That is, the outer surface of the battery case 120 may be rolled through the pressing roll 230 to press the cell 100.

Also, the pressing roll 230 may comprise an upper roll 210 and a lower roll 220 to press upper and lower portions of the cell 100.

Furthermore, the battery case 120 of the cell 100 may be pressed by applying heat having a temperature of 20° C. to 100° C.

Also, the pressing roll 230 may be provided as an induction heating roller to apply heat to the battery case 120. Here, the upper roll 210 or each of the upper roll 210 and the lower roll 220 may be provided as an induction heating roller.

At this time, referring to FIG. 7, the upper roll 210 may comprise a shaft 212 provided at a center thereof, an induction coil 213 wound around an outer circumferential surface of the shaft 212, and an outer cylinder 211 provided on an outer circumferential surface thereof. When power is supplied to the induction coil 213, a magnetic flux crossing the outer cylinder 211 of the upper roll 210 is generated. As a result, the magnetic flux may generate an eddy current in the outer cylinder 211, and, as illustrated in FIG. 7(a), a current flow such as an equivalent circuit may be generated to heat the outer cylinder 211. At this time, heating of an initial heating portion 215 of the outer cylinder 211 may start to heat the entire outer cylinder 211.

Referring to FIGS. 5 to 7, the support body 240 may support the pressing roll 230. At this time, the support body 240 may support the upper roll 210. Here, the upper roll 210 may be rotatably mounted on the support body 240.

The distance adjustment means 280 may adjust a distance between the upper roll 210 and the lower roll 220 by moving the support body 240. At this time, the distance adjustment means 280 may move the support body 240 vertically through a moving frame 260 to move the upper roll 210 in the vertical direction.

The distance adjustment means 280 may comprise a motor 281 and a screw rod 282 that rotates by the motor 281.

When the screw rod 282 rotates by the motor 281, the moving frame 260 coupled to the screw rod 282 is moved vertically. At this time, the support body 240 supporting the upper roll 210 provided under the moving frame 260 may be moved vertically to adjust the distance between the upper roll 210 and the lower roll 220. Here, a screw portion may be formed on an outer circumferential surface of the screw rod 282, and a screw groove corresponding to the screw portion of the screw rod 282 may be formed in the moving frame 260.

The motor 281 may be provided as a servo motor.

The lower roll 220 may be rotatably supported through a support part 250.

The actuator 270 may be connected to the support body 240 on which the upper roll 210 is mounted. Here, the actuator may adjust pressing force applied to the battery case 120. At this time, the actuator 270 may adjust pressing force applied to the cell 100 by adjusting the pressing force applied to the upper roll 210 through the support body 240.

Also, the actuator 270 adjusts the pressing force applied to the battery case 120 according to a structure and thickness of the cell 100. Here, the pressing force may be adjusted within a pressure range of 100 kgf to 400 kgf.

Also, the actuator 270 may be provided as a pneumatic actuator or a hydraulic actuator.

Referring to FIGS. 1, 2, and 5, as described above, in the pre-degassing device 200 for manufacturing the secondary battery according to an embodiment of the present invention, when the secondary battery is manufactured, heat may be applied to the cell 100, in which the electrode assembly 110 and the electrolyte are accommodated in the battery case 120, to press the cell 100 before the secondary aging process (S70) after the primary aging process (S40) and the primary charging process (S50), thereby discharging a gas inside the electrode assembly 110 to the outside of the electrode assembly 110.

Therefore, the non-reaction area on the surface of the negative electrode may be significantly reduced without increasing in amount of discharged electrolyte inside the electrode assembly 110, and the Li-plating on the surface of the negative electrode may be significantly reduced.

As a result, the battery capacity may increase, and the cycle deterioration may be prevented.

While the present invention has been particularly shown and described with reference to the specific embodiments thereof, the method for manufacturing the secondary battery and the pre-degassing device for manufacturing the secondary battery according to the present invention are not limited thereto. It will be understood by those of ordinary skill in the art that various changes in form and details may be made therein without departing from the spirit and scope of the present invention.

Furthermore, the scope of protection of the present invention will be clarified by the appended claims.

DESCRIPTION OF THE SYMBOLS

100: Cell
110: Electrode assembly
111: Positive electrode lead
112: Negative electrode lead
120: Battery case
121: Accommodation part
122: Gas pocket part
200: Pre-degassing device
210: Upper roll
220: Lower roll
230: Pressing roll
240: Support body
250: Support
260: Moving frame
270: Actuator
280: Distance adjustment means
281: Motor
282: Screw rod
P: Electrolyte supply pipe
S1: Sealing part
S2: Sealed part

The invention claimed is:

1. A method for manufacturing a secondary battery, the method comprising:
an accommodation process of accommodating an electrode assembly in an accommodation part formed inside a battery case to form a cell;
an electrolyte injection process of injecting an electrolyte into the accommodation part of the battery case;
a primary aging process of permitting a first predetermined time to elapse so that the electrode assembly is impregnated into the electrolyte;
a primary charging process of primarily charging and discharging the cell;
a pre-degassing process of pressing the battery case to discharge a gas inside the electrode assembly to an outside of the electrode assembly; and
a secondary aging process of permitting a second predetermined time to elapse so that the electrode assembly is impregnated into the electrolyte,
wherein, during the pre-degassing process, the battery case is pressed while applying heat to the battery case.

2. The method of claim 1, further comprising, after the secondary aging process, a secondary charging/discharging process of secondarily charging and discharging the cell.

3. The method of claim 2, further comprising, before the secondary charging/discharging process and after the secondary aging process, a degassing process of discharging the gas inside of the battery case to an outside of the battery case.

4. The method of claim 3, wherein, during the secondary aging process, the permitting of the second predetermined time to elapse is performed for a first part of the second predetermined time with the cell being at room temperature and for a second part of the second predetermined time with the cell being at a high temperature above room temperature.

5. The method of claim 1, wherein, during the pre-degassing process, an outer surface of the battery case is pressed by a pressing roll using a rolling motion.

6. The method of claim 5, wherein, during the pre-degassing process, heat having a temperature of 20° C. to 100° C. is applied to the battery case by the pressing roll.

7. The method of claim 5, wherein, during the pre-degassing process, a pressing force applied to the battery case is adjusted according to a structure and thickness of the cell, the pressing force being adjusted within a pressure range of 100 kgf to 400 kgf.

8. The method of claim 7, wherein, during the pre-degassing process, an actuator connected to a support body that supports the pressing roll adjusts the pressing force that is applied to the battery case.

9. The method of claim 5, wherein the pressing roll is an upper roll, and during the pre-degassing process, a lower roll presses the battery case, the upper and lower rolls respectively pressing upper and lower portions of the cell, and during the pre-degassing process, a distance between the upper roll and the lower roll is adjusted according to a thickness of the cell.

10. The method of claim 1, wherein, during the pre-degassing process, heat is applied to the battery case by a pressing roll that is heated using induction heating.

* * * * *